(12) United States Patent
Fang et al.

(10) Patent No.: US 11,259,649 B2
(45) Date of Patent: Mar. 1, 2022

(54) INFANT CARRIER AND FOLDABLE BACKREST RETURNING MECHANISM THEREOF

(71) Applicant: Wonderland Switzerland AG, Steinhausen (CH)

(72) Inventors: Liwu Fang, Guangdong (CN); Er-Xue Wang, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/991,047

(22) Filed: Aug. 12, 2020

(65) Prior Publication Data
US 2021/0045543 A1 Feb. 18, 2021

(30) Foreign Application Priority Data
Aug. 15, 2019 (CN) .......................... 201921328561.9

(51) Int. Cl.
*A47D 1/02* (2006.01)
*B62B 9/10* (2006.01)
*A47D 13/02* (2006.01)

(52) U.S. Cl.
CPC .............. *A47D 1/02* (2013.01); *A47D 13/025* (2013.01); *B62B 9/104* (2013.01)

(58) Field of Classification Search
CPC ........ A47D 1/02; A47D 13/025; B62B 9/104; A47C 4/04; A47C 4/045

USPC ......... 297/44, 452.4, 256, 315, 350, 351, 42
See application file for complete search history.

(56) References Cited

U.S. PATENT DOCUMENTS

2002/0185895 A1\* 12/2002 Marshall .................. A47D 1/02
297/153

FOREIGN PATENT DOCUMENTS

DE 20 2017 106 245 U1 11/2017
JP 2001-97228 A 4/2001

\* cited by examiner

*Primary Examiner* — Milton Nelson, Jr.
(74) *Attorney, Agent, or Firm* — Winston Hsu

(57) ABSTRACT

A foldable backrest returning mechanism including a backrest plate and an elastic returning device is disclosed. The backrest plate has a foldable portion. The foldable portion divides the backrest plate at least into a first plate and a second plate. The first plate and the second plate are foldable relative to the foldable portion. The elastic returning device is assembled between the first plate and the second plate, the elastic returning device provides an elastic force to drive the first plate and the second plate to approach each other relative to the foldable portion for making front surfaces of the first plate and the second plate have a returning tendency to approach toward each other. Accordingly, the present invention can prevent arching of the backrest plate at the foldable portion. Furthermore, the present invention provides an infant carrier.

8 Claims, 8 Drawing Sheets

INFANT CARRIER AND FOLDABLE BACKREST RETURNING MECHANISM THEREOF

BACKGROUND OF THE INVENTION

1. Field of the Invention

The present invention relates to an infant carrier and a foldable backrest returning mechanism thereof.

2. Description of the Prior Art

A stroller has been widely applied to a family with a baby today. The stroller usually includes a stroller frame and a seat disposed on the stroller frame. The seat includes a backrest plate, a seat plate, and a cloth cover covering the backrest plate and the seat plate for connection. During the process of expanding the stroller, arching of a middle portion of the backrest plate, which is caused by pulling of the cloth cover and restraint of two ends of the backrest plate while the middle portion of the backrest plate is not restrained, may occur when the backrest plate is expanded downward to a specific angle. The aforesaid arching problem can be only solved by returning the backrest plate upward to its original position, so as to influence the expanding process and operational convenience of the stroller.

Thus, it is necessary to design a foldable backrest returning mechanism and an infant carrier thereof for improving the aforesaid drawback.

SUMMARY OF THE INVENTION

One purpose of the present invention is to provide a foldable backrest returning mechanism with an automatic returning function.

Another purpose of the present invention is to provide an infant carrier having an automatic returning backrest.

For achieving the aforesaid purposes, a foldable backrest returning mechanism of the present invention includes a backrest plate and an elastic returning device. The backrest plate has a foldable portion. The foldable portion divides the backrest plate at least into a first plate and a second plate. The first plate and the second plate are foldable relative to the foldable portion. The elastic returning device is assembled between the first plate and the second plate. The elastic returning device provides an elastic force to drive the first plate and the second plate to approach each other relative to the foldable portion for making front surfaces of the first plate and the second plate have a returning tendency to approach toward each other.

Preferably, the foldable portion is a crease formed on the front surface of the backrest plate.

Preferably, the crease penetrates through at least one of two opposite surfaces of the backrest plate.

Preferably, the backrest plate is an integrally-formed plate.

Preferably, the foldable portion is an indentation line formed at a middle of the backrest plate.

Preferably, the elastic returning device is a tension spring, a compression spring, or a torsional spring, and a stretching direction of the tension spring, a stretching direction of the compression spring, or a torsional direction of the torsional spring intersects with the foldable portion.

Preferably, a containing slot is formed on the backrest plate and an opening formed on the front surface of the backrest plate, the containing slot includes a first slot formed on the first plate and a second slot formed on the second plate, the first slot is communicated with the second slot, the tension spring is located in the containing slot, an end of the tension spring is connected to the first plate, and the other end of the tension spring is connected to the second plate.

Preferably, the foldable portion extends through the containing slot from a slot wall of the containing slot.

Preferably, a through slot is formed on the backrest plate and simultaneously penetrates through the front surfaces and back surfaces of the first plate and the second plate, the foldable portion is cut off by the through slot, a first blind slot is formed on the first plate and has an opening located at the front surface of the first plate, the through slot is communicated with the first blind slot, the torsional spring is located in the through slot, one end of the torsional spring extends into the first blind slot to be connected to the first plate, and the other end of the torsional spring is connected to the back surface of the second plate.

Preferably, a second blind slot is formed on the second plate and has an opening located at the back surface of the second plate, the through slot is communicated with the second blind slot, and the other end of the torsional spring extends into the second blind slot to be connected to the second plate.

Preferably, the compression spring is located at the back surface of the backrest plate, an end of the compression spring is connected to the first plate, and the other end of the compression spring is connected to the second plate.

For achieving the aforesaid purposes, an infant carrier of the present invention includes a carrier frame, a seat plate assembled with the carrier frame, and the aforesaid foldable backrest returning mechanism. A bottom end of the backrest plate is connected to the seat plate.

Compared with the prior art, the foldable backrest returning mechanism of the present invention includes the backrest plate and the elastic returning device. The backrest plate has the foldable portion. The foldable portion divides the backrest plate at least into the first plate and the second plate. The first plate is foldably connected to the second plate via the foldable portion. The elastic returning device is assembled between the first plate and the second plate. The elastic returning device provides an elastic force to drive the first plate and the second plate to approach each other relative to the foldable portion to make the front surfaces of the first plate and the second plate have a returning tendency to approach toward each other. In such a manner, if the first plate and the second plate tend to rotate rearward, forward rotation of the first plate and the second plate relative to the foldable portion driven by the elastic returning device can prevent arching of the backrest plate at the foldable portion.

Furthermore, the infant carrier of the present invention includes the carrier frame, the seat plate assembled with the carrier frame, and the foldable backrest returning mechanism. The bottom end of the backrest plate is connected to the seat plate for preventing arching of the backrest plate at a specific angle with expansion of the carrier frame, so as to make sure that the infant carrier can be functioning properly and to improve operational convenience of the infant carrier.

These and other objectives of the present invention will no doubt become obvious to those of ordinary skill in the art after reading the following detailed description of the preferred embodiment that is illustrated in the various figures and drawings.

DETAILED DESCRIPTION

The detailed description for preferred embodiments of the present invention is provided with attached drawings as follows.

Figure 1:
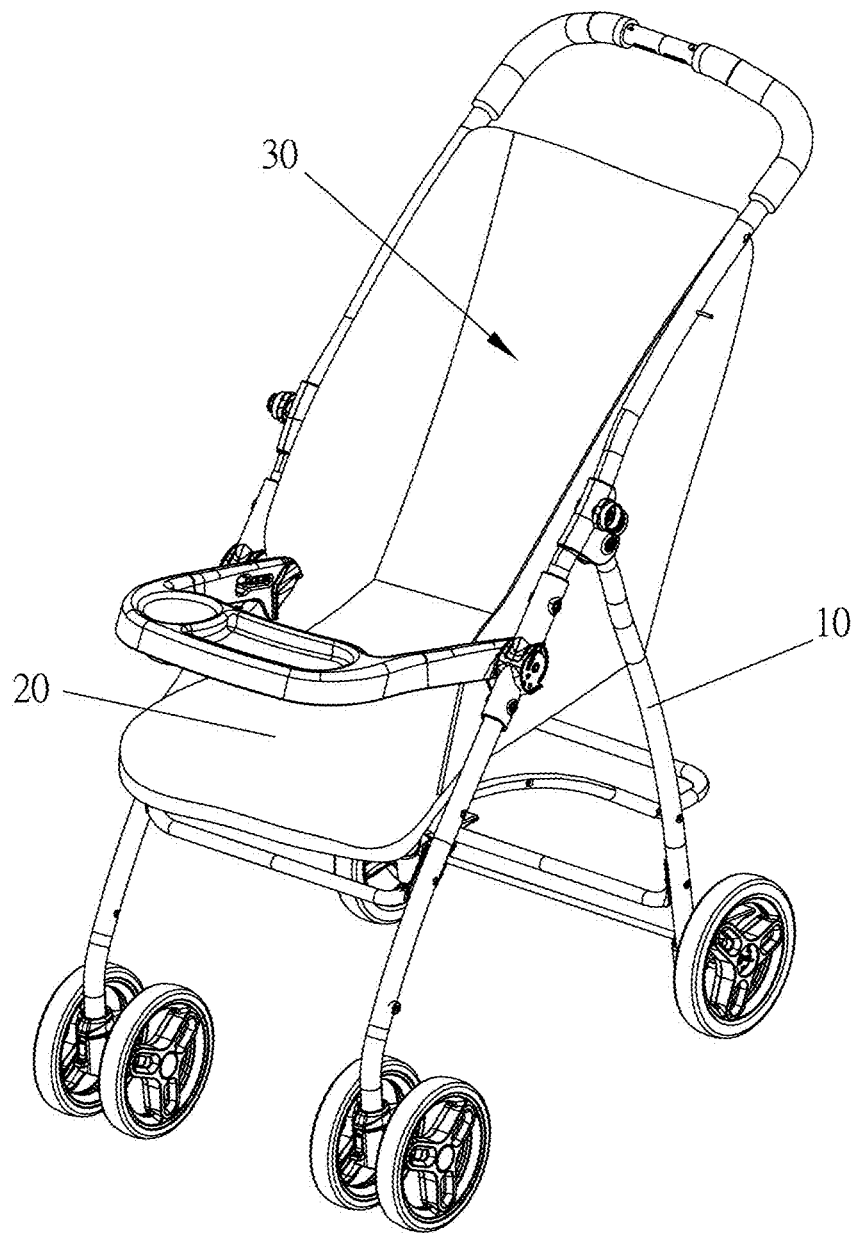
FIG. 1 is a diagram of an infant carrier according to a first embodiment of the present invention.

As shown in FIG. 1, an infant carrier 100 of the present invention includes a carrier frame 10, a seat plate 20 assemble with the carrier frame 10, and a foldable backrest returning mechanism 30. A bottom end of a backrest plate 31 mentioned in the following is connected to the seat plate 20. Specifically, the bottom end of the backrest plate 31 is rotatably connected to the seat plate 20 such that the backrest plate 31 can form a seating space for holding an infant cooperatively with the seat plate 20. For example, a cloth cover covers the backrest plate 31 and the seat plate 20 for making connection of the backrest plate 31 and the seat plate 20 more firm and providing a buffer function to help the infant sit thereon more comfortably. Furthermore, the infant carrier 100 is usually divided into two categories (but not limited thereto): one is able to go on the ground, such as a stroller; the other one is unable to go on the ground, such as a dining chair. It could be understood that the structural design of the infant carrier 100 is well known to one skilled in the art and the related description is omitted herein.

Figure 2:
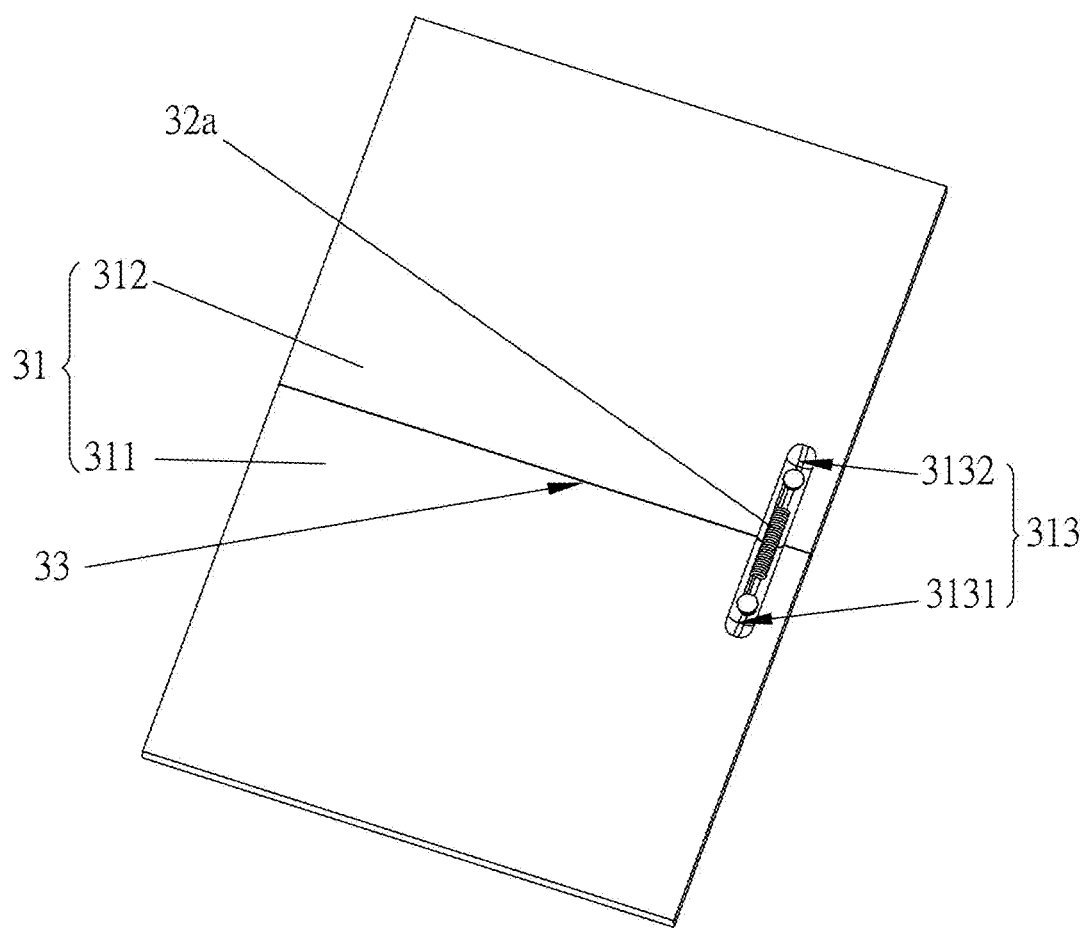
FIG. 2 is a diagram of a foldable backrest returning mechanism according to the first embodiment of the present invention.
Figure 3:
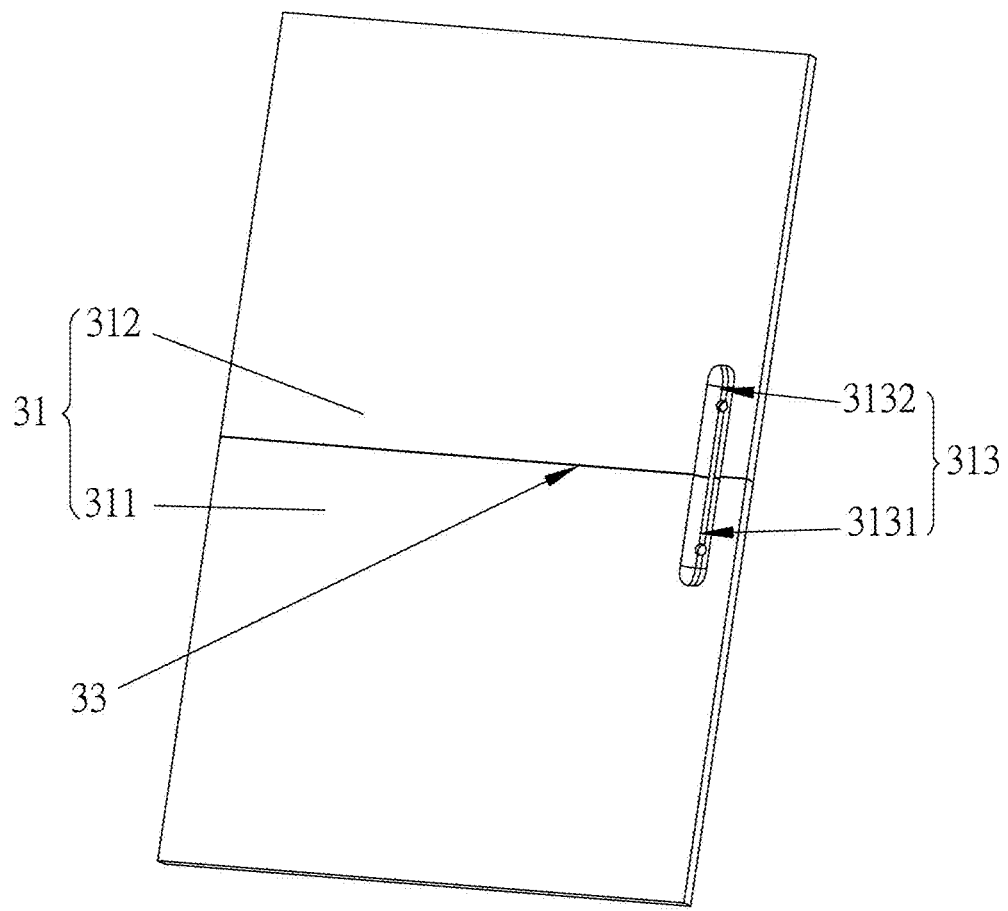
FIG. 3 is a diagram of the foldable backrest returning mechanism in FIG. 2 after a tension spring is hidden.
Figure 4:
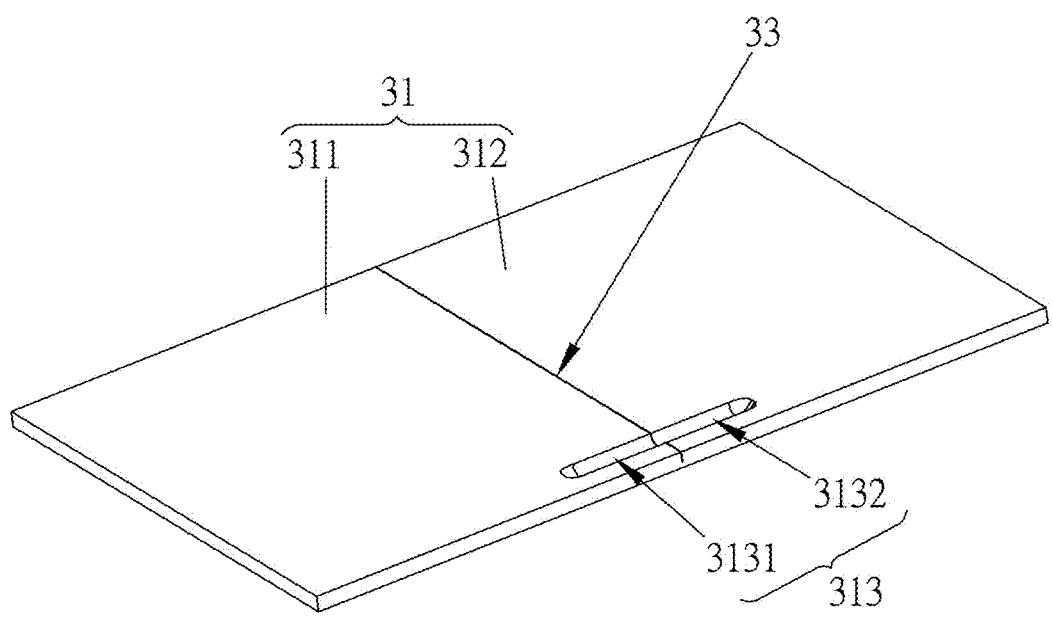
FIG. 4 is a diagram of the foldable backrest returning mechanism in FIG. 3 from another viewing angle.

As shown in FIGS. 2-4, the foldable backrest returning mechanism 30 of a first embodiment includes the backrest plate 31 and an elastic returning device. The backrest plate 31 has a foldable portion 33. The foldable portion 33 divides the backrest plate 31 into a first plate 311 and a second plate 312. The first plate 311 is foldably connected to the second plate 312 via the foldable portion 33. The elastic returning device is assembled between the first plate 311 and the second plate 312. The elastic returning device provides an elastic force to drive the first plate 311 and the second plate 312 to approach each other relative to the foldable portion 33 to make front surfaces of the first plate 311 and the second plate 312 have a returning tendency to approach toward each other. In such a manner, if the first plate 311 and the second plate 312 tend to rotate rearward, forward folding of the first plate 311 and the second plate 312 relative to the foldable portion 33 driven by the elastic returning device can prevent arching of the backrest plate 31 at the foldable portion 33. To be more specific, the front surfaces of the first plate 311 and the second plate 312 are aligned with and parallel to each other while returning to their original positions for providing stronger support to a back of the infant. It could be understood that the foldable portion 33 could divide the backrest plate 31 into the first plate 311, the second plate 312 and at least one plate structure (but not limited thereto) according to the practical application of the present invention.

For example, as shown in FIGS. 2-4, the backrest plate 31 could be an integrally-formed plate for assembly convenience and improving the support strength of the backrest plate 31, but not limited thereto, meaning that the backrest plate 31 could be a split plate that the first plate 311 is pivotably connected to the second plate 312. Specifically, the foldable portion 33 is a crease formed on the front surface of the backrest plate 31. The crease penetrates through at least one of two opposite surfaces of the backrest plate 31, so as to ensure folding of the first plate 311 and the second plate 312 relative to the foldable portion 33. It can be understood that the backrest plate 31 is a split plate if the crease penetrates through the two opposite surfaces of the backrest plate 31. In practical application, the foldable portion 33 could be an indentation line (not shown in figures) formed at a middle of the backrest plate 31 to ensure folding of the first plate 311 and the second plate 312 relative to the foldable portion 33, and this design can enhance the connection strength of the first plate 311 and the second plate 312 for extending the service life of the backrest plate 31.

As shown in FIGS. 2-4, in this embodiment, the elastic returning device could be a tension spring 32a. The stretching direction of the tension spring 32a intersects with the foldable portion 33 to make the elastic force of the tension spring 32a directly exerted upon the first plate 311 and the second plate 312, so that the front surfaces of the first plate 311 and the second plate 312 can approach toward each other and return to their original positions quickly. Specifically, the tension spring 32a is located at the front surface of the backrest plate 31. A containing slot 313 is formed on the backrest plate 31 and has an opening located at the front surface of the backrest plate 31. The containing slot 313 includes a first slot 3131 formed on the first plate 311 and a second slot 3132 formed on the second plate 312. The first slot 3131 is communicated with the second slot 3132. The tension spring 32a is located in the containing slot 313. One end of the tension spring 32a is connected to the first plate 311, and the other end of the tension spring 32a is connected to the second plate 312, so as to make the tension spring 32a embedded in the front surface of the backrest plate 31 for preventing protrusion of the tension spring 32a from the backrest plate 31. To be more specific, the foldable portion 33 extends through the containing slot 313 from a slot wall of the containing slot 313, so that the tension spring 32a can respond quickly to elastically drive the first plate 311 and the second plate 312.

More detailed description for the first embodiment is provided as follows. As shown in FIGS. 1-4, when the infant carrier 100 is expanded, the backrest plate 31 rotates downward relative to the seat plate 20 with expansion of the carrier frame 10. During rotation of the backrest plate 31, the front surfaces of the first plate 311 and the second plate 312 tend to rotate relative to the crease, which is caused by pulling of the cloth cover and restraint of two ends of the backrest plate 31 while the middle portion of the backrest plate 31 is not restrained, so as to make the front surfaces of the first plate 311 and the second plate 312 move away from each other. At this time, the tension spring 32a drives the front surfaces of the first plate 311 and the second plate 312 to approach toward each other for preventing arching of the backrest plate 31 at the crease, so as to make sure that the infant carrier 100 can be functioning properly and to improve operational convenience of the infant carrier 100.

Figure 5:
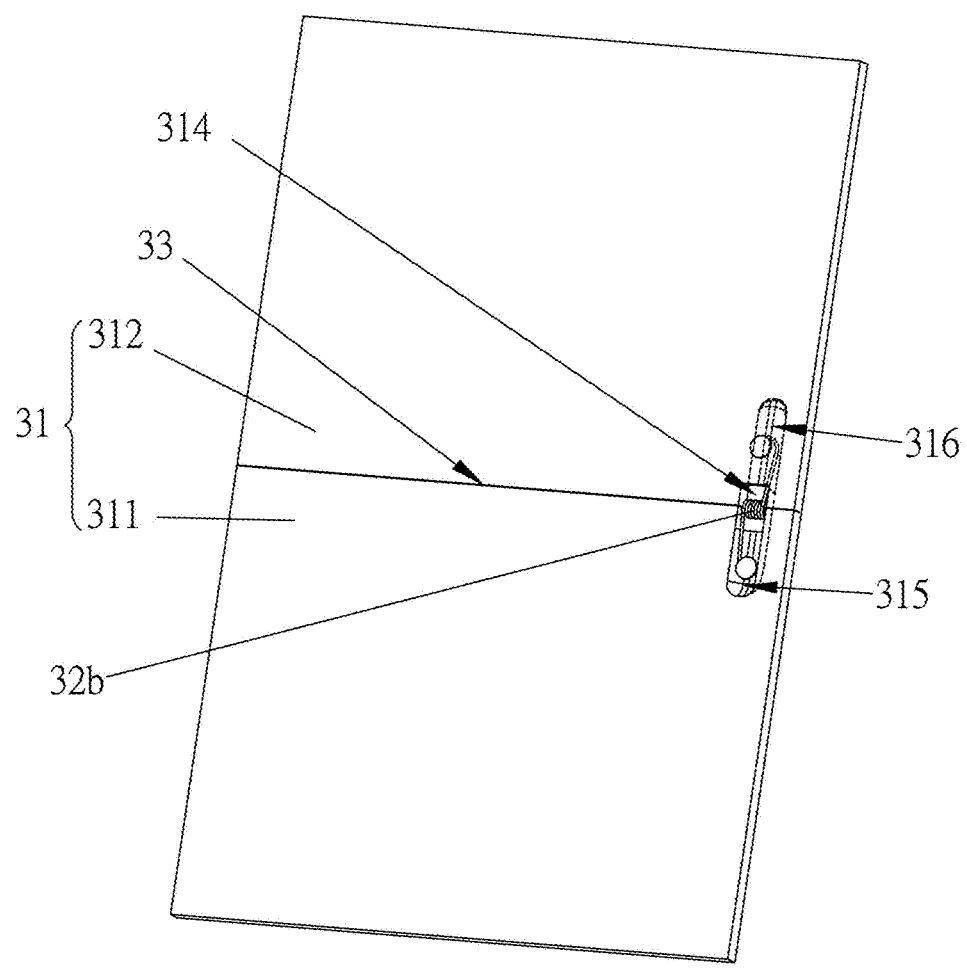
FIG. 5 is a diagram of a foldable backrest returning mechanism according to a second embodiment of the present invention.
Figure 6:
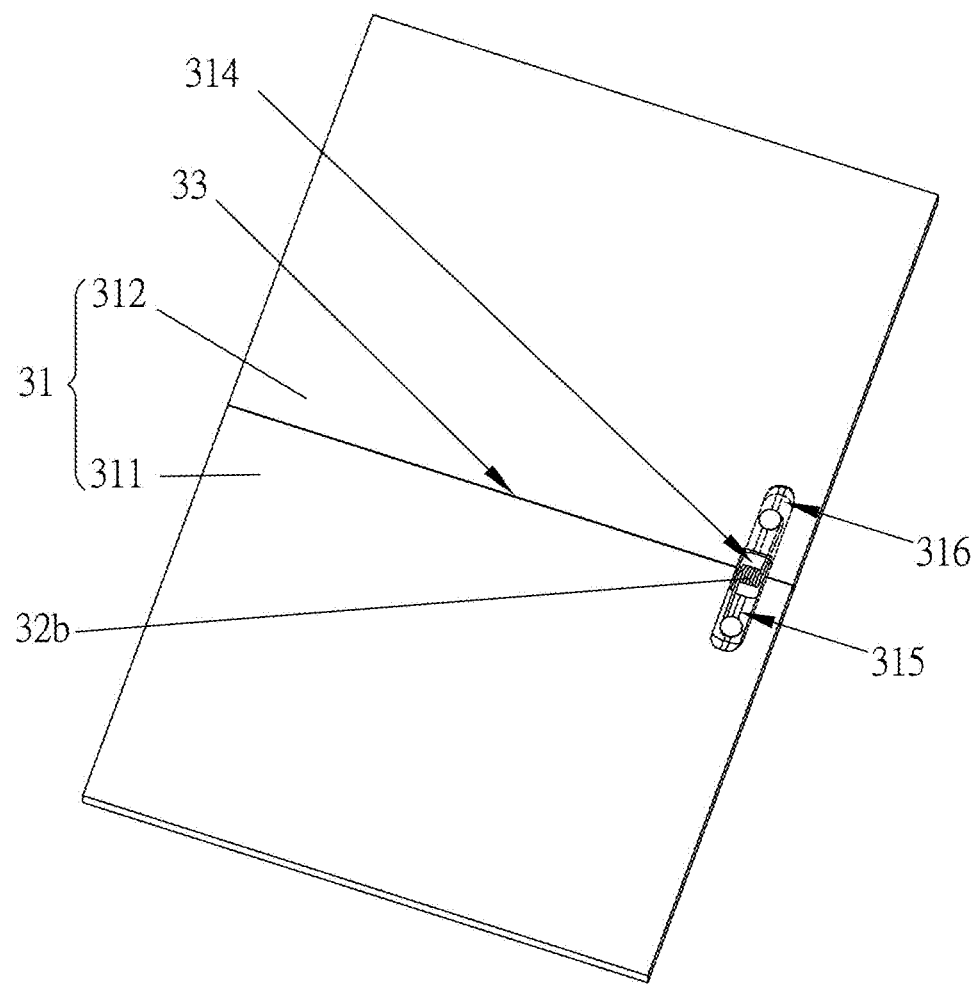
FIG. 6 is a diagram of the foldable backrest returning mechanism in FIG. 5 from another viewing angle.
Figure 7:
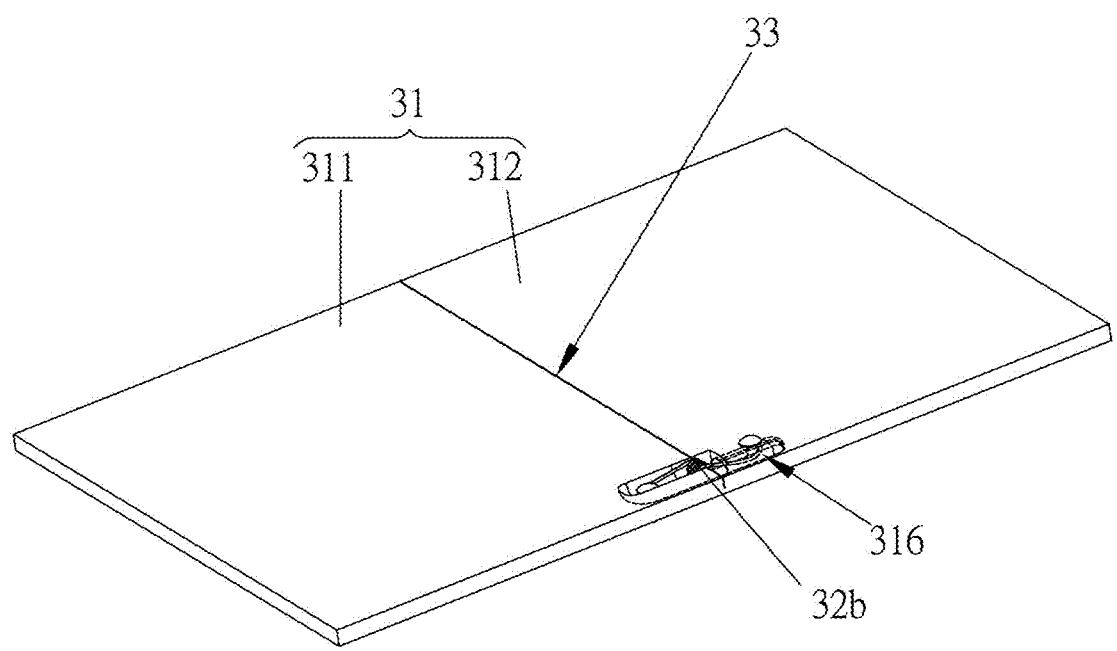
FIG. 7 is a diagram of the foldable backrest returning mechanism in FIG. 6 from another viewing angle.

As shown in FIGS. 5-7, the structural design of a foldable backrest returning mechanism 30' according to a second embodiment of the present invention is substantially identical to the structural design of the foldable backrest returning mechanism 30 according to the first embodiment. The differences between the foldable backrest returning mechanism 30' and the foldable backrest returning mechanism 30 are provided as follows:

(1) the elastic returning device is a torsional spring 32b in this embodiment;
(2) the foldable portion 33 is cut off by a through slot 314 simultaneously penetrating through the front surfaces and the back surfaces of the first plate 311 and the second plate 312; a first blind slot 315 is formed on the first plate 311 and has an opening located at the front surface of the first plate 311, a second blind slot 316 is formed on the second plate 312 and has an opening located at the back surface of the second plate 312, and the through slot 314 is communicated with the first blind slot 315 and the second blind slot 316; the torsional spring 32b is located in the through slot 314, one end of the torsional spring 32b extends into the first blind slot 315 to be connected to the first plate 312, and the other end of the torsional spring 32b extends into the second blind slot 316 to be connected to the second plate 312.

Besides the aforesaid differences, the related description for the other designs of the foldable backrest returning mechanism 30' could be reasoned by analogy according to the first embodiment and omitted herein.

More detailed description for the second embodiment is provided as follows. As shown in FIGS. 5-7, when the infant carrier 100 is expanded, the backrest plate 31 rotates downward relative to the seat plate 20 with expansion of the carrier frame 10. During rotation of the backrest plate 31, the first plate 311 and the second plate 312 tend to rotate relative to the crease, which is caused by pulling of the cloth cover and restraint of two ends of the backrest plate 31 while the middle portion of the backrest plate 31 is not restrained, so as to make the front surfaces of the first plate 311 and the second plate 312 move away from each other. At this time, the torsional spring 32b drives the front surfaces of the first plate 311 and the second plate 312 to approach toward each other for preventing arching of the backrest plate 31 at the crease, so as to make sure that the infant carrier 100 can be functioning properly and to improve operational convenience of the infant carrier 100.

Figure 8:
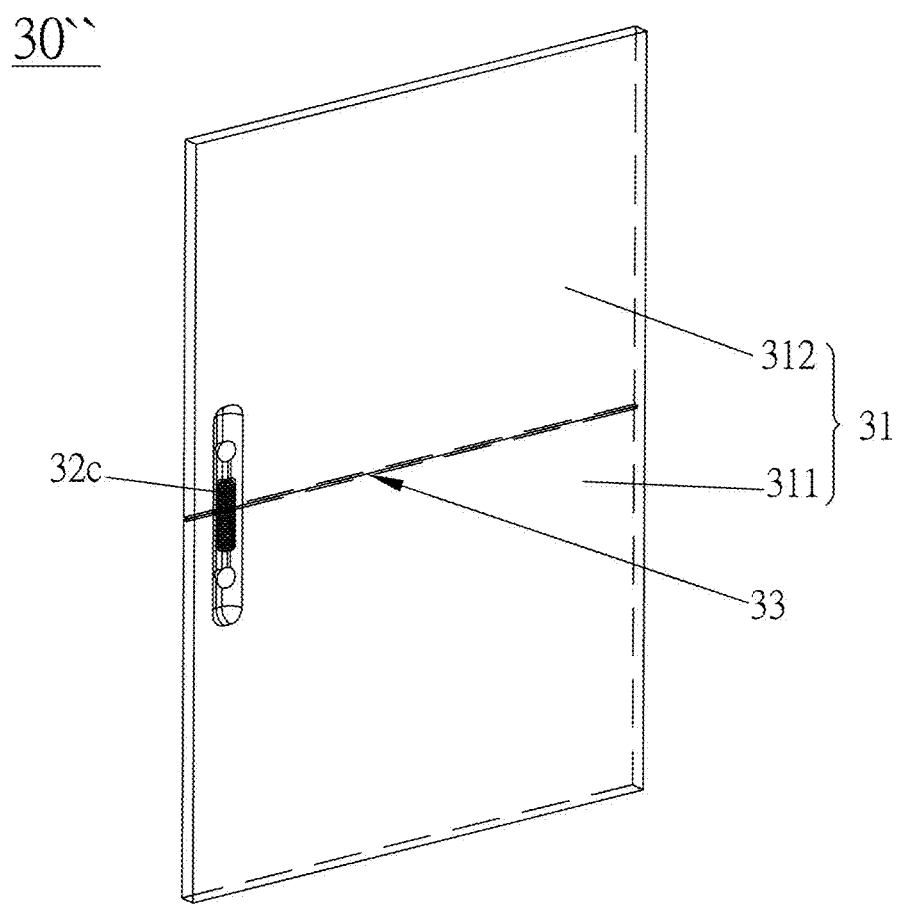
FIG. 8 is a diagram of a foldable backrest returning mechanism according to a third embodiment of the present invention.

As shown in FIG. 8, the structural design of a foldable backrest returning mechanism 30" according to a third embodiment of the present invention is substantially identical to the structural design of the foldable backrest returning mechanism 30 according to the first embodiment. The differences between the foldable backrest returning mechanism 30" and the foldable backrest returning mechanism 30 are provided as follows:

(1) the elastic returning device is a compression spring 32c in this embodiment;
(2) the compression spring 32c is located at the back surface of the backrest plate 31, one end of the compression spring 32c is connected to the first plate 311, and the other end of the compression spring 32c is connected to the second plate 312.

Besides the aforesaid differences, the related description for the other designs of the foldable backrest returning mechanism 30" could be reasoned by analogy according to the first embodiment and omitted herein.

More detailed description for the third embodiment is provided as follows. As shown in FIG. 8, when the infant carrier 100 is expanded, the backrest plate 31 rotates downward relative to the seat plate 20 with expansion of the carrier frame 10. During rotation of the backrest plate 31, the first plate 311 and the second plate 312 tend to rotate relative to the crease, which is caused by pulling of the cloth cover and restraint of two ends of the backrest plate 31 while the middle portion of the backrest plate 31 is not restrained, so as to make the front surfaces of the first plate 311 and the second plate 312 move away from each other. At this time, the compression spring 32c drives the front surfaces of the first plate 311 and the second plate 312 to approach toward each other for preventing arching of the backrest plate 31 at the crease, so as to make sure that the infant carrier 100 can be functioning properly and to improve operational convenience of the infant carrier 100.

Compared with the prior art, each of the foldable backrest returning mechanisms 30, 30' and 30" of the present invention includes the backrest plate 31 and the elastic returning device. The foldable portion 33 divides the backrest plate 31 at least into the first plate 311 and the second plate 312. The first plate 311 is foldably connected to the second plate 312 via the foldable portion 33. The elastic returning device is assembled between the first plate 311 and the second plate 312. The elastic returning device provides an elastic force to drive the first plate 311 and the second plate 312 to approach each other relative to the foldable portion 33 to make the front surfaces of the first plate 311 and the second plate 312 have a returning tendency to approach toward each other. In such a manner, if the first plate 311 and the second plate 312 tend to rotate rearward, forward folding of the first plate 311 and the second plate 312 relative to the foldable portion 33 driven by the elastic returning device can prevent arching of the backrest plate 31 at the foldable portion 33.

Furthermore, the infant carrier 100 of the present invention includes the carrier frame 10, the seat plate 20 assembled with the carrier frame 10, and one of the foldable backrest returning mechanisms 30, 30' and 30". The bottom end of the backrest plate 31 is connected to the seat plate 20 for preventing arching of the backrest plate 31 at a specific angle with expansion of the carrier frame 10, so as to make sure that the infant carrier 100 can be functioning properly and to improve operational convenience of the infant carrier 100.

To be noted, the front surfaces of the first plate 311 and the second plate 312 are surfaces facing the seating space for holding the infant. The direction of the front surfaces of the first plate 311 and the second plate 312 rotating toward each other relative to the foldable portion 33 is the direction of gradually reducing the included angle between the front surfaces of the first plate 311 and the second plate 312 with forward rotation of the first plate 311 and the second plate 312. The direction of the front surfaces of the first plate 311 and the second plate 312 returning toward each other relative to the foldable portion 33 is the direction of gradually reducing the included angle between the front surfaces of the first plate 311 and the second plate 312 with forward rotation of the first plate 311 and the second plate 312.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A foldable backrest returning mechanism comprising:
a backrest plate having a foldable portion, the foldable portion dividing the backrest plate at least into a first plate and a second plate, the first plate and the second plate being foldable relative to the foldable portion, a containing slot being formed on the backrest plate, the containing slot comprising a first slot formed on the first plate and a second slot formed on the second plate, and the first slot being communicated with the second slot; and an elastic returning device assembled between the first plate and the second plate, the elastic returning device providing an elastic force to drive the first plate and the second plate to approach each other relative to the foldable portion for making front surfaces of the first plate and the second plate have a returning tendency to approach toward each other, the elastic returning device being a tension spring, the tension spring being located in the containing slot, an end of the tension spring being connected to the first plate, and the other end of the tension spring being connected to the second plate.

2. The foldable backrest returning mechanism of claim 1, wherein the foldable portion is a crease formed on the front surface of the backrest plate.

3. The foldable backrest returning mechanism of claim 2, wherein the crease penetrates through at least one of two opposite surfaces of the backrest plate.

4. The foldable backrest returning mechanism of claim 1, wherein the backrest plate is an integrally-formed plate.

5. The foldable backrest returning mechanism of claim 1, wherein the foldable portion is an indentation line formed at a middle of the backrest plate.

6. The foldable backrest returning mechanism of claim 1, wherein a stretching direction of the tension spring intersects with the foldable portion, and the containing slot has an opening formed on a front surface of the backrest plate.

7. The foldable backrest returning mechanism of claim 1, wherein the foldable portion extends through the containing slot from a slot wall of the containing slot.

8. An infant carrier comprising:
a carrier frame;
a seat plate assembled with the carrier frame; and
a foldable backrest returning mechanism comprising:
a backrest plate having a foldable portion, a bottom end of the backrest plate being connected to the seat plate, the foldable portion dividing the backrest plate at least into a first plate and a second plate, the first plate and the second plate being foldable relative to the foldable portion, a containing slot being formed on the backrest plate, the containing slot comprising a first slot formed on the first plate and a second slot formed on the second plate, and the first slot being communicated with the second slot; and an elastic returning device assembled between the first plate and the second plate, the elastic returning device providing an elastic force to drive the first plate and the second plate to approach each other relative to the foldable portion for making front surfaces of the first plate and the second plate have a returning tendency to approach toward each other, the elastic returning device being a tension spring, the tension spring being located in the containing slot, an end of the tension spring being connected to the first plate, and the other end of the tension spring being connected to the second plate.

* * * * *